(12) United States Patent
Ida et al.

(10) Patent No.: US 11,060,583 B2
(45) Date of Patent: Jul. 13, 2021

(54) VIBRATION-PROOF MOUNT

(71) Applicant: MITSUBISHI HEAVY INDUSTRIES ENGINE & TURBOCHARGER, LTD., Sagamihara (JP)

(72) Inventors: Noriaki Ida, Tokyo (JP); Takeshi Kadowaki, Sagamihara (JP); Shuichi Miura, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 16/492,779

(22) PCT Filed: Mar. 2, 2018

(86) PCT No.: PCT/JP2018/007968
§ 371 (c)(1),
(2) Date: Sep. 10, 2019

(87) PCT Pub. No.: WO2018/168516
PCT Pub. Date: Sep. 20, 2018

(65) Prior Publication Data
US 2020/0072314 A1 Mar. 5, 2020

(30) Foreign Application Priority Data
Mar. 15, 2017 (JP) .............................. JP2017-049587

(51) Int. Cl.
*F16M 11/00* (2006.01)
*F16F 15/067* (2006.01)
(Continued)

(52) U.S. Cl.
CPC ............ *F16F 15/067* (2013.01); *F02B 63/04* (2013.01); *F16M 7/00* (2013.01)

(58) Field of Classification Search
CPC .... G01M 7/027; F16M 11/10; B60G 17/0195
See application file for complete search history.

(56) References Cited

U.S. PATENT DOCUMENTS

| 4,869,474 A | * | 9/1989 | Best | B60G 17/0195 267/136 |
| 5,337,864 A | * | 8/1994 | Sjostrom | B60G 13/18 188/266.2 |

(Continued)

FOREIGN PATENT DOCUMENTS

| CN | 203052126 U | 7/2013 |
| CN | 104565717 A | 4/2015 |

(Continued)

OTHER PUBLICATIONS

Extended European Search Report, dated Feb. 7, 2020, for European Application No. 18767187.0.
(Continued)

*Primary Examiner* — Amy J. Sterling
(74) *Attorney, Agent, or Firm* — Birch, Stewart, Kolasch & Birch, LLP

(57) ABSTRACT

A vibration-proof mount which is interposed between a vibration device including a vibration source and an elastic member disposed on a foundation surface includes an upper base plate including a first mounting portion where the vibration device is mounted, a lower base pate arranged below the upper base plate and supporting the upper base plate, and a plurality of connecting members connecting the upper base plate and the lower base plate, the plurality of connecting members including at least two or more first connecting members disposed between the first mounting portion and the lower base plate at intervals from one another. The first mounting portion is configured to have higher rigidity than the lower base plate.

1 Claim, 8 Drawing Sheets

(51) Int. Cl.
*F02B 63/04* (2006.01)
*F16M 7/00* (2006.01)

(56) References Cited

U.S. PATENT DOCUMENTS

| | | | | |
|---|---|---|---|---|
| 5,594,177 | A * | 1/1997 | Hanse | G01M 7/027 73/663 |
| 6,626,412 | B1 * | 9/2003 | Lindsay | F16M 11/10 248/180.1 |
| 2015/0144763 | A1 | 5/2015 | Aeffner | |

FOREIGN PATENT DOCUMENTS

| | | | |
|---|---|---|---|
| CN | 104595419 | A | 5/2015 |
| CN | 105805495 | A | 7/2016 |
| EP | 2671791 | A1 | 12/2013 |
| JP | 61-167735 | A | 7/1986 |
| JP | 8-93843 | A | 4/1996 |
| JP | 2001-153296 | A | 6/2001 |
| JP | 2008-196640 | A | 8/2008 |
| KR | 10-2015-0023619 | A | 3/2015 |
| WO | WO 91/02921 | A1 | 3/1991 |

OTHER PUBLICATIONS

International Search Report issued PCT/JP2018/007968 (PCT/ISA/210), dated May 15, 2018.
Written Opinion of the International Searching Authority issued PCT/JP2018/007968 (PCT/ISA/237), dated May 15, 2018.
Korean Office Action dated Sep. 22, 2020 for Application No. 10-2019-7026527 along with an English translation.
Chinese Office Action and Search Report, dated Aug. 4, 2020, for Chinese Application No. 201880015691.9 with an Engbsh translation of the Chinese Office Action.

* cited by examiner

Case of rigidity of first mounting portion > rigidity of lower base plate

Case of rigidity of first mounting portion < rigidity of lower base plate

Case in which first cylinder vibrates

Case in which second cylinder vibrates

VIBRATION-PROOF MOUNT

TECHNICAL FIELD

The present disclosure relates to a vibration-proof mount which is interposed between a vibration device including vibration sources (for example, an engine including cylinders) and elastic members (for example, metallic springs) disposed on a foundation surface.

BACKGROUND

Conventionally, in an engine mounted with respect to a foundation surface (fixed engine), a vibration-proof mount is interposed between the engine and metallic springs disposed on the foundation surface so as to prevent a vibration generated in the engine from being transmitted to the foundation surface.

As the vibration-proof mount of this type, for example, Patent Document 1 discloses a technique of making an upper frame supporting an engine and a lower frame arranged below the upper frame from a plurality of mold steels.

CITATION LIST

Patent Literature

Patent Document 1: JP2008-196640A

SUMMARY

Technical Problem

Meanwhile, from viewpoints of a manufacturing cost and a transportation cost of a vibration-proof mount, the vibration-proof mount desirably has a light weight. However, the technique disclosed in Patent Document 1 does not consider reducing the weight of the vibration-proof mount at all.

At least some embodiments of the present invention was made under the above background, and an object of the at least some embodiments of the present invention is to provide a vibration-proof mount which has a lighter weight than a conventional vibration-proof mount.

Solution to Problem (1) A vibration-proof mount according to at least one embodiment of the present invention is a vibration-proof mount which is interposed between a vibration device including a vibration source and an elastic member disposed on a foundation surface, the vibration-proof mount including an upper base plate including a first mounting portion where the vibration device is mounted, a lower base pate arranged below the upper base plate and supporting the upper base plate, and a plurality of connecting members connecting the upper base plate and the lower base plate, the plurality of connecting members including at least two or more first connecting members disposed between the first mounting portion and the lower base plate at intervals from one another. The first mounting portion is configured to have higher rigidity than the lower base plate.

With the above configuration (1), a load from the vibration device is applied to the first mounting portion where the vibration device is mounted. Then, the load applied to the first mounting portion is applied to the lower base plate by the plurality of connecting members which include at least the two or more first connecting members disposed between the first mounting portion and the lower base plate at intervals from one another. Then, the first mounting portion is configured to have higher rigidity than the lower base plate. Thus, since deformation in the first mounting portion owing to the load applied from the vibration device is reduced as compared with a case in which the first mounting portion has lower rigidity than the lower base plate, it is possible to more dispersedly apply, to the lower base plate, the load from the vibration device applied to the first mounting portion. Thus, since the load from the vibration device is more dispersedly applied to the lower base plate, it is possible to reduce the thickness of the lower base plate, and thus to reduce the weight of the entire vibration-proof mount than ever before.

In particular, in a case in which the vibration device includes a plurality of vibration sources, for example, if the plurality of vibration sources respectively have different vibration timings, the magnitude, the direction, the position, or the like of the load applied to the first mounting portion may periodically change. With the above configuration (1), even if the magnitude, the direction, the position, or the like of the load applied to the first mounting portion periodically changes, it is possible to widely and dispersedly apply, to the lower base plate, the load from the vibration device applied to the first mounting portion in each cycle.

(2) In some embodiments, in the above configuration (1), the upper base plate further includes a second mounting portion where a connected device is mounted, the connected device being connected to the vibration device via a connecting portion, and the second mounting portion is configured to be thinner than the first mounting portion.

In many cases, the load of the connected device (for example, a generator) applied to the second mounting portion is smaller than the load of the vibration device (for example, an engine) applied to the first mounting portion. Thus, the second mounting portion is deformed less than the first mounting portion. That is, the load applied to the second mounting portion is applied to the lower base plate more widely and dispersedly than the load applied to the first mounting portion. Accordingly, with the above configuration (2), since the second mounting portion is configured to be thinner than the first mounting portion, it is possible to further reduce the weight of the entire vibration-proof mount.

(3) In some embodiments, in the above configuration (2), the connecting portion is configured to restrain a vibration generated from the vibration device from being transmitted to the connected device, and the upper base plate includes a separating portion separating the first mounting portion from the second mounting portion.

The second mounting portion has, as loads applied thereto, the load from the connected device mounted on the second mounting portion and a load owing to the vibration of the vibration device transmitted to the second mounting portion. With the above configuration (3), with the connecting portion and the separating portion, it is possible to reduce the load applied to the second mounting portion due to the vibration generated from the vibration device. Thus, it is possible to further reduce the thickness of the second mounting portion. The separating portion can further prevent the vibration generated from the vibration device from being transmitted to the second mounting portion as compared with the following configuration (4).

(4) In some embodiments, in the above configuration (2), the connecting portion is configured to restrain a vibration generated from the vibration device from being transmitted to the connected device, and the upper base plate includes a linking portion linking the first mounting portion and the second mounting portion, the linking portion being made of a member which is softer than the first mounting portion.

With the above configuration (4), with the connecting portion and the linking portion, it is possible to reduce the load applied to the second mounting portion due to the vibration generated from the vibration device. Thus, it is possible to further reduce the thickness of the second mounting portion. In addition, since the linking portion links the first mounting portion and the second mounting portion, for example, it is possible to dispersedly apply, to the lower base plate, the load from the vibration device applied to the first mounting portion, via the second connecting member to be described below. That is, it is possible to apply, to the lower base plate, the load applied to the first mounting portion and the loads applied to the second mounting portion more dispersedly than the above configuration (3).

(5) In some embodiments, in any one of the above configurations (2) to (4), the plurality of connecting members include a second connecting member disposed between the second mounting portion and the lower base plate, and the first connecting members are configured to have higher rigidity than the second connecting member.

With the above configuration (5), it is possible to reduce the deformation in the first connecting members as compared with a case in which the first connecting members have rigidity similar to the second connecting member.

(6) In some embodiments, in any one of the above configurations (2) to (5), the vibration device is constituted by an engine, and the connected device is constituted by a generator driven by the engine.

With the above configuration (6), it is possible to apply the vibration-proof mount to a generating device including the engine and the generator.

(7) In some embodiments, in the above configuration (6), the first connecting members each have a plate-like shape, a housing space portion defined by the first connecting members and the lower base plate is formed between the first mounting portion and the lower base plate, and at least a part of an oil pan of the engine is housed in the housing space portion while being spaced apart from the lower base plate.

With the above configuration (7), since at least the part of the oil pan of the engine is housed in the housing space portion defined between the first mounting portion and the lower base plate, it is possible to lower the engine mounted on the first mounting portion. In addition, since the at least the part of the oil pan of the engine is housed in the housing space portion while being spaced apart from the lower base plate, it is possible to prevent the vibration generated in the engine from being transmitted to the lower base plate without intervening the plurality of connecting members.

Advantageous Effects

According to at least an embodiment of the present invention, it is possible to provide a vibration-proof mount which has a lighter weight than a conventional vibration-proof mount.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

A vibration-proof mount according to an embodiment of the present invention is a mount which is interposed between a vibration device including vibration sources and elastic members disposed on a foundation surface. In the present disclosure, a description is made by taking an engine including cylinders each serving as a vibration source as an example of the vibration device and coil springs as an example of the elastic members.

The coil springs may be metallic springs each made of a carbon steel or an alloy steel, or non-metallic springs each made of natural rubber or plastic.

Alternatively, the elastic members may be, in place of the coil springs, other springs such as plate springs or disc springs. Alternatively, the elastic members may be, in place of the coil springs, flat plate-like elastic bodies (for example, vibration-proof pads) each formed of a rubber material such as fluorine rubber or silicon rubber, or a resin material such as a fluorine resin or a nylon resin.

Figure 1A:
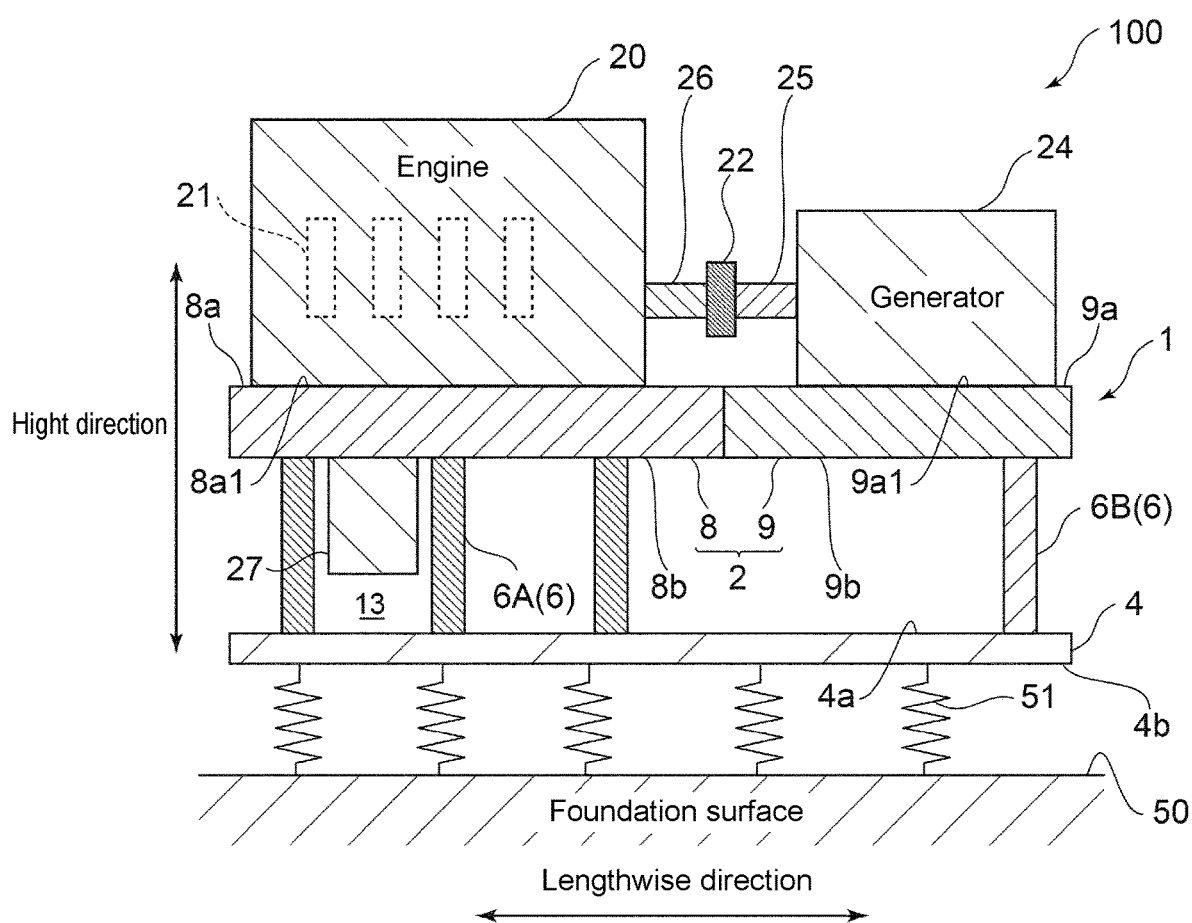
FIG. 1A is a side view schematically showing a vibration-proof mount according to an embodiment of the present invention.
Figure 1B:
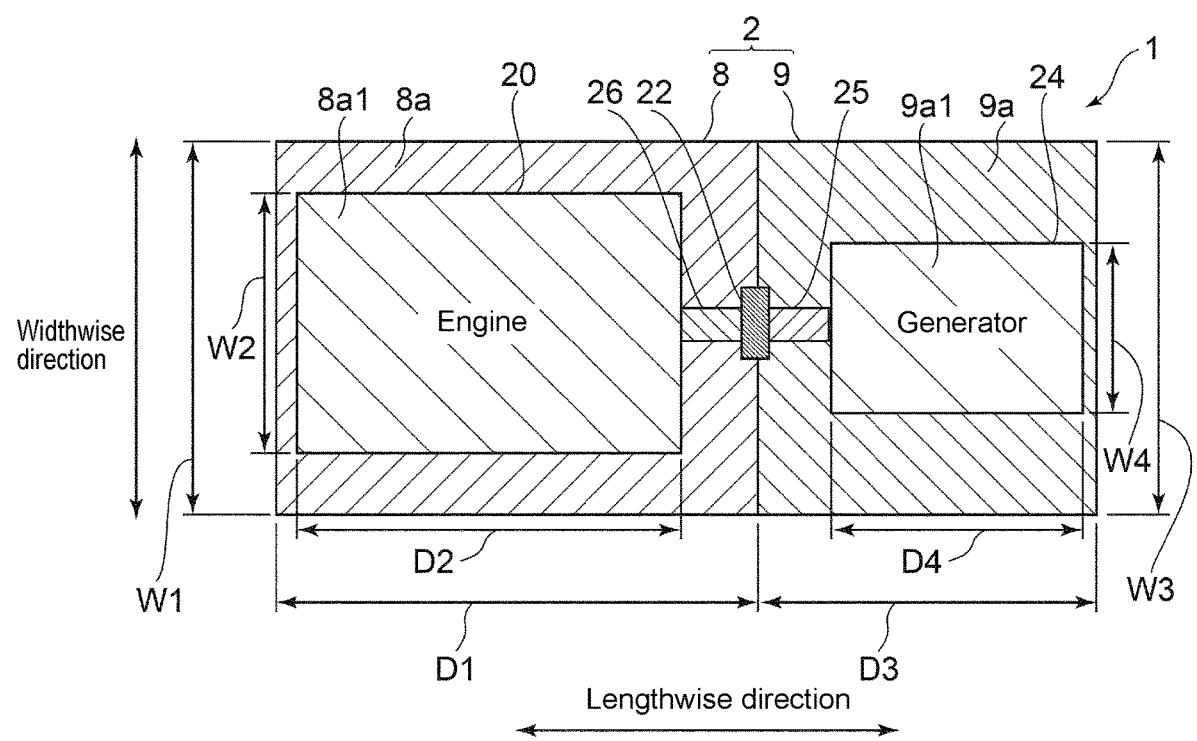
FIG. 1B is a plan view schematically showing the vibration-proof mount according to an embodiment of the present invention.
Figure 2A:
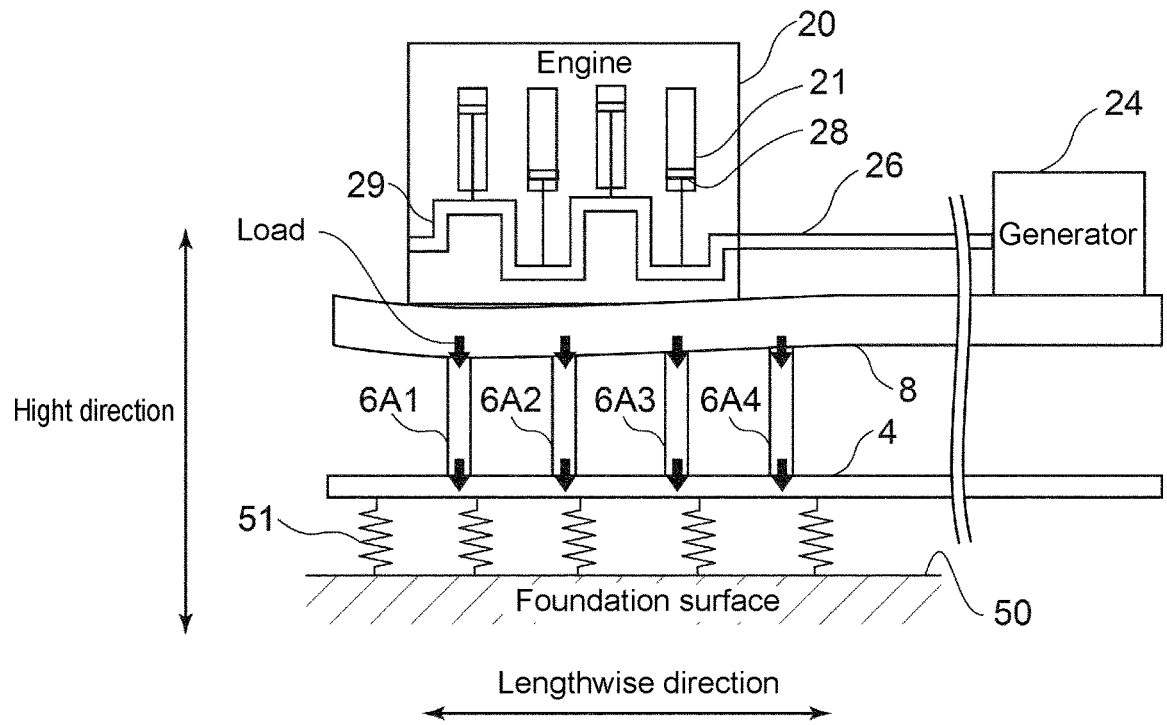
FIG. 2A is a view for describing a difference in load applied to a lower base plate owing to a difference in rigidity of the first mounting portion.
Figure 2B:
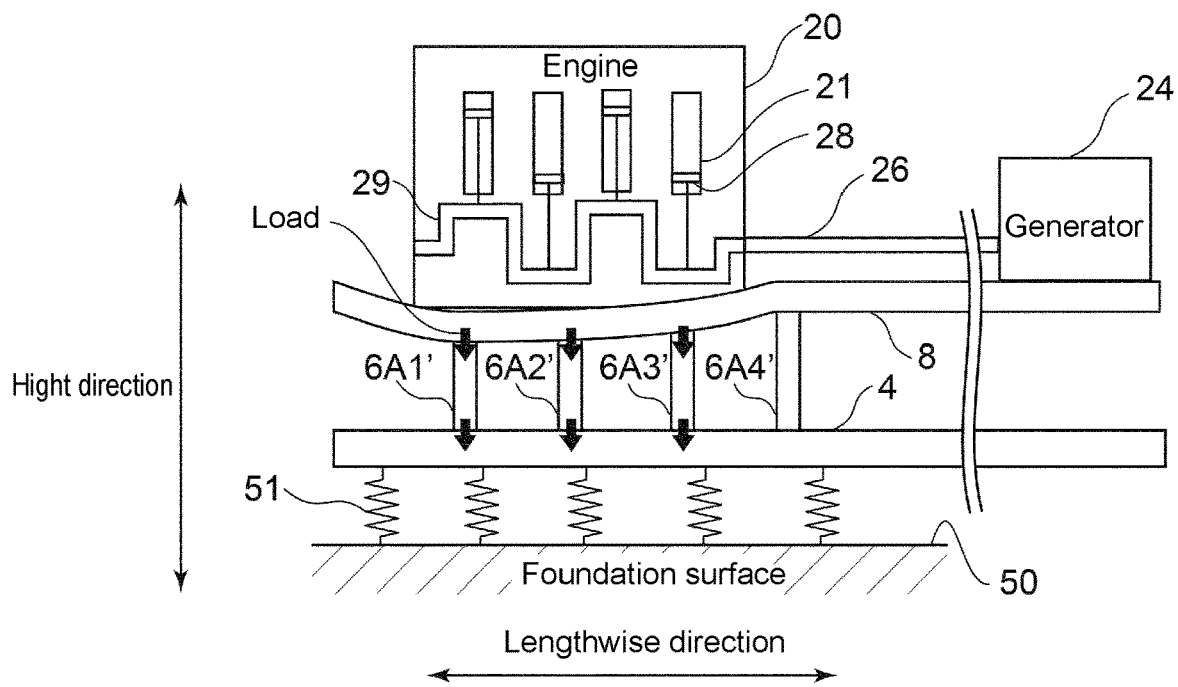
FIG. 2B is a view for describing a difference in load applied to the lower base plate owing to the difference in rigidity of the first mounting portion.
Figure 3A:
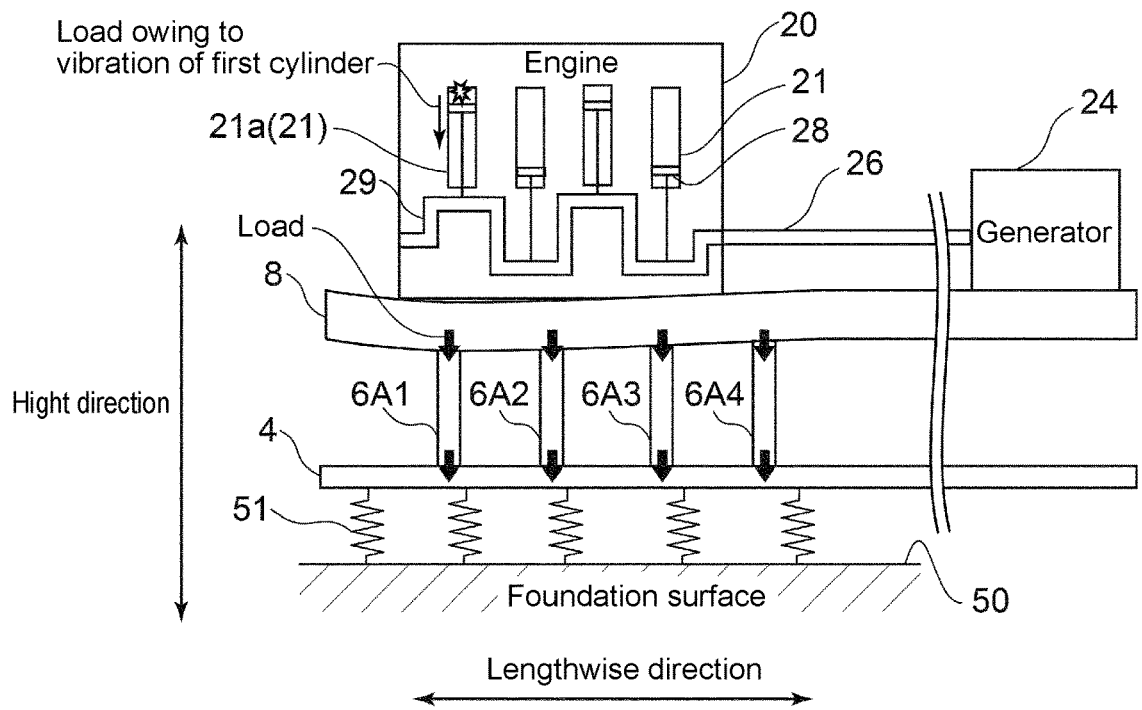
FIG. 3A is a view for describing the load applied to the lower base plate of the vibration-proof mount according to an embodiment of the present invention.
Figure 3B:
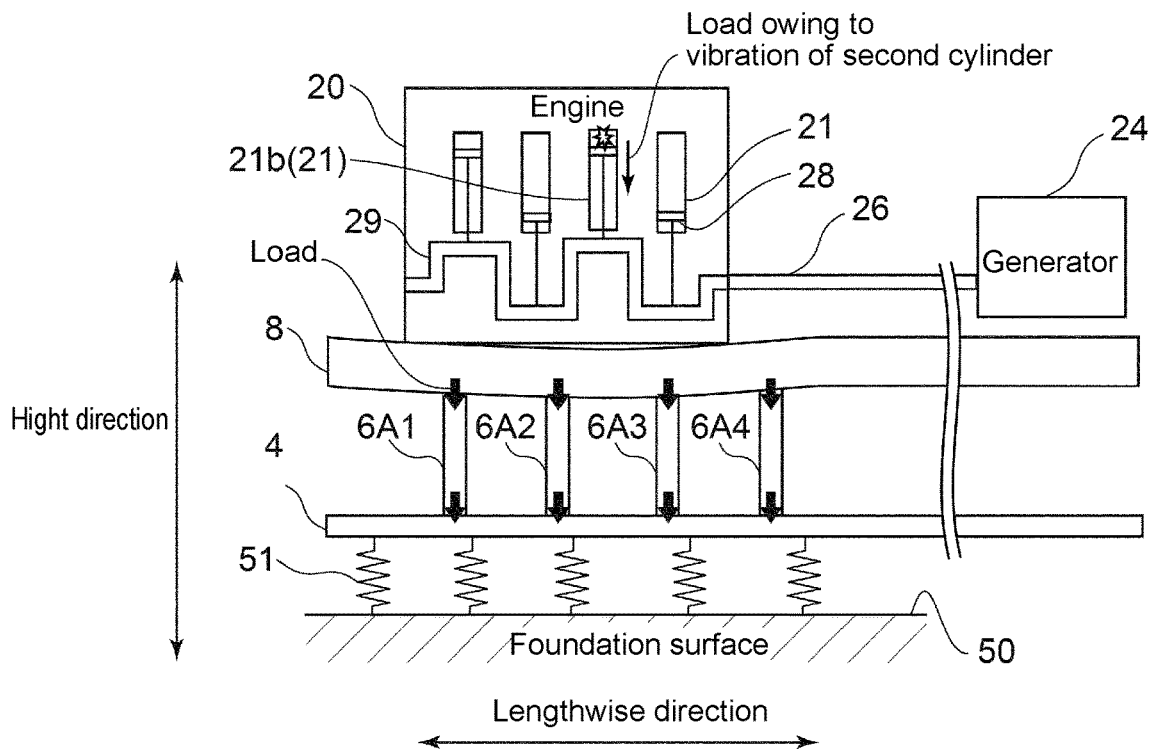
FIG. 3B is a view for describing the load applied to the lower base plate of the vibration-proof mount according to an embodiment of the present invention.
Figure 4:
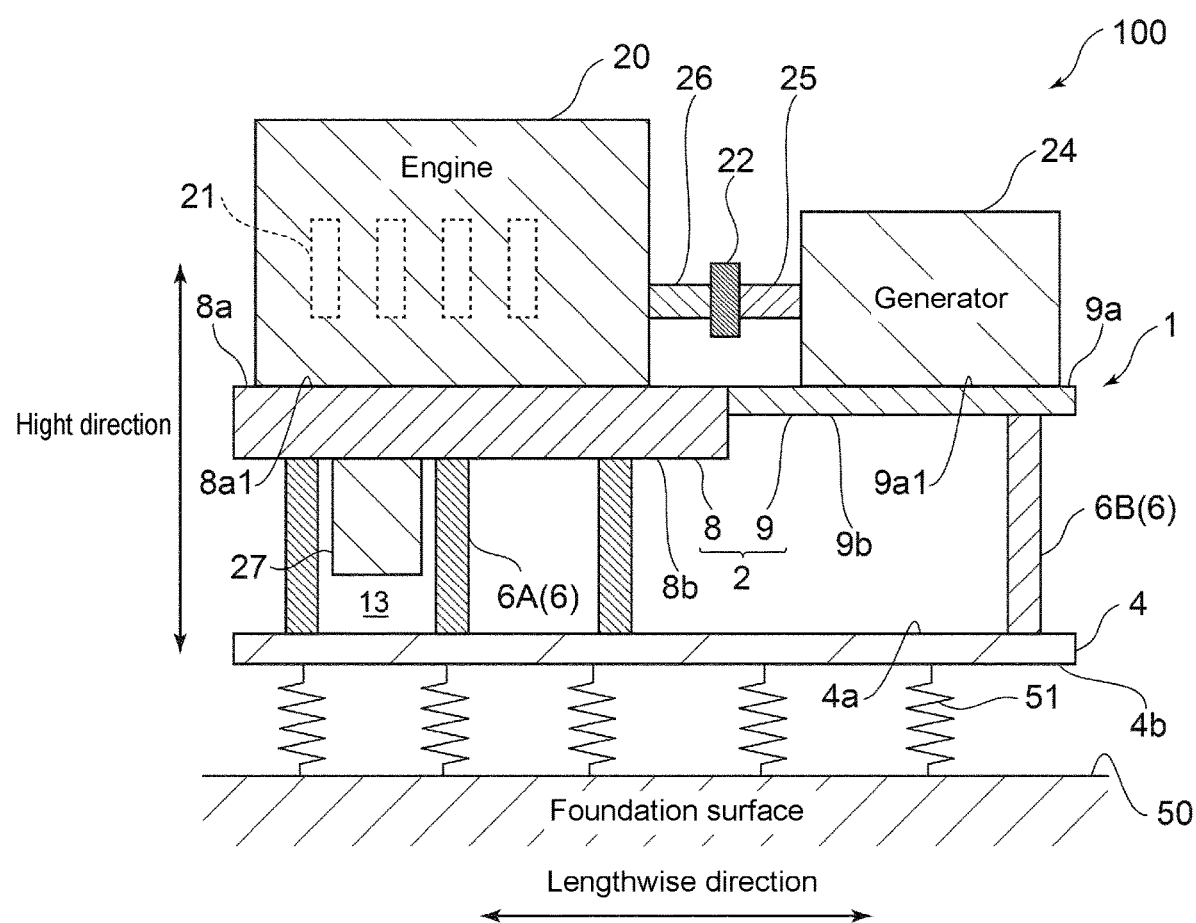
FIG. 4 is a side view schematically showing the vibration-proof mount according to an embodiment of the present invention.
Figure 5A:
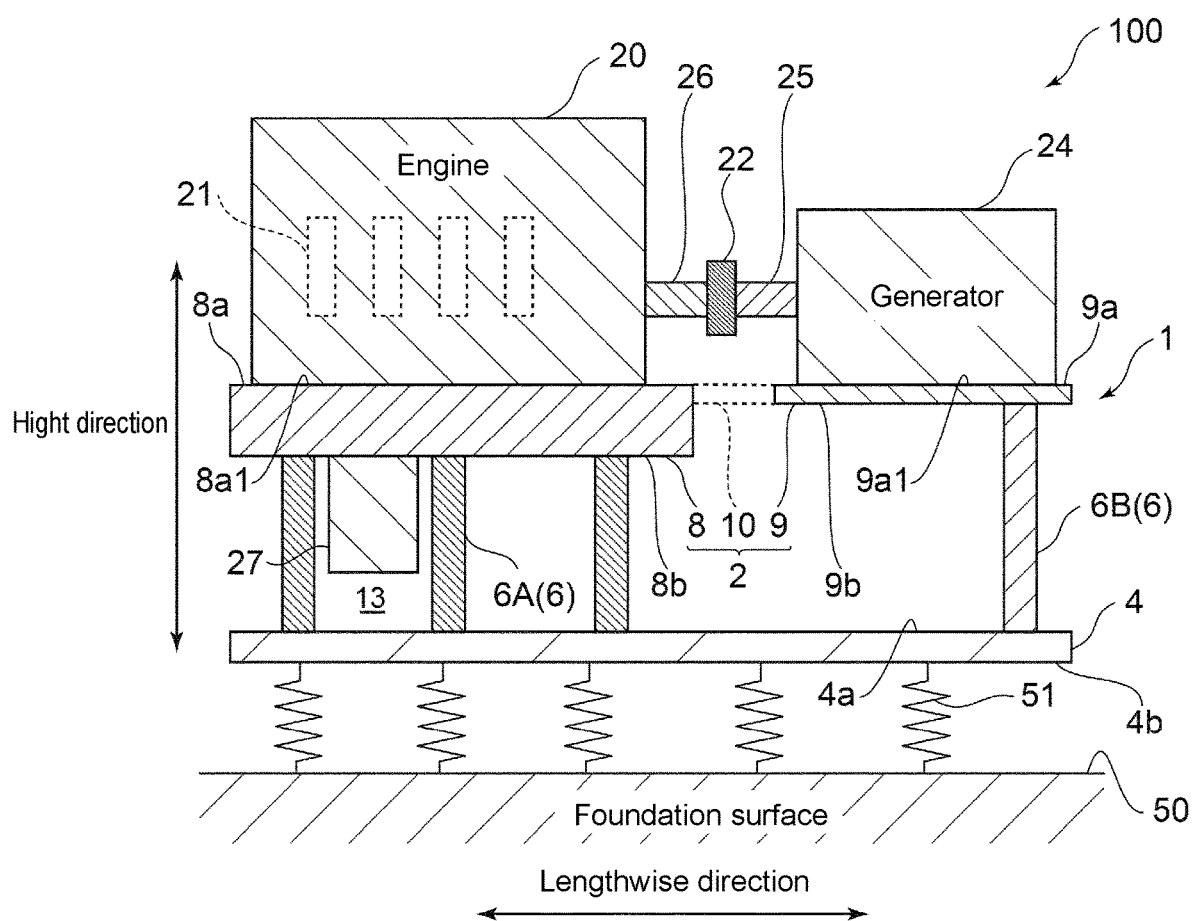
FIG. 5A is a side view schematically showing the vibration-proof mount according to an embodiment of the present invention.
Figure 5B:
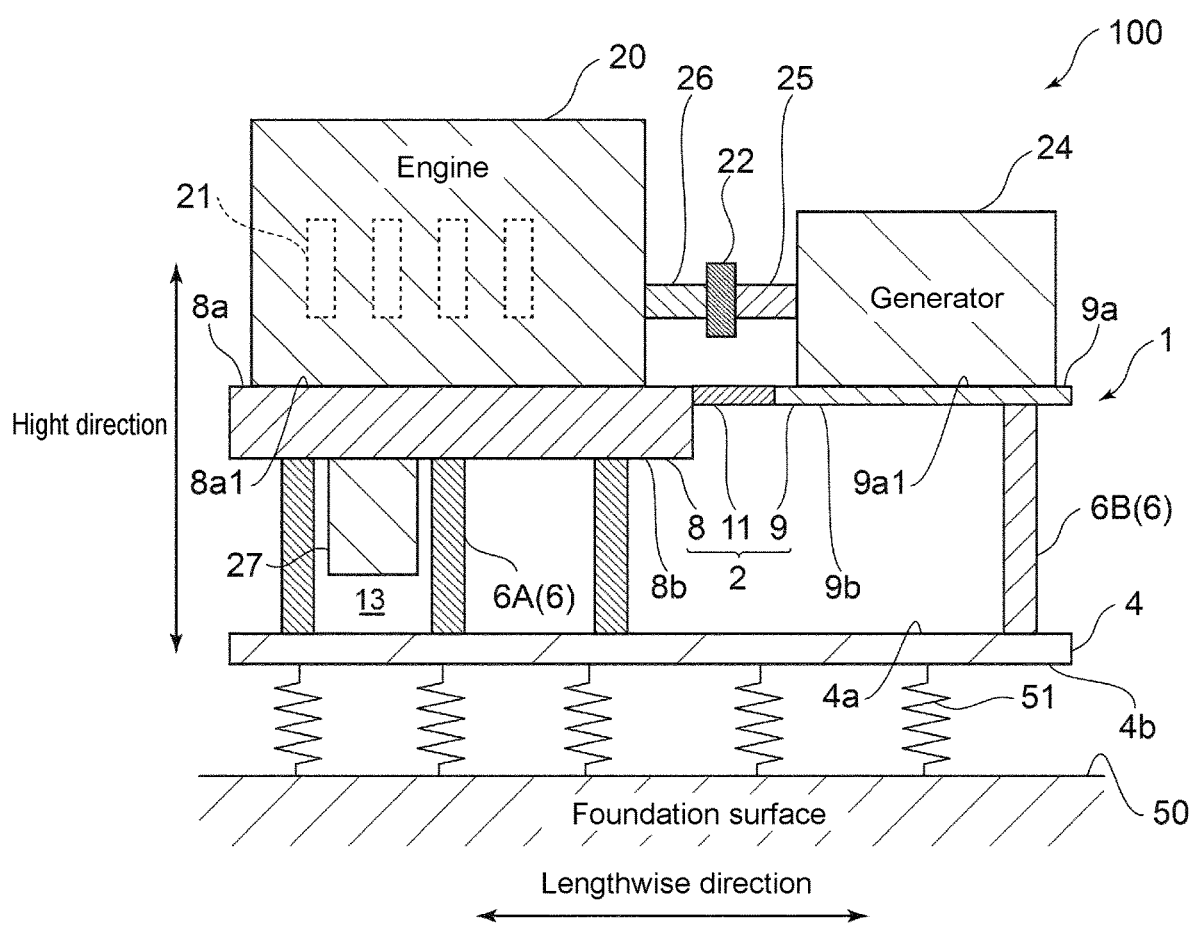
FIG. 5B is a side view schematically showing the vibration-proof mount according to an embodiment of the present invention.
Figure 6:
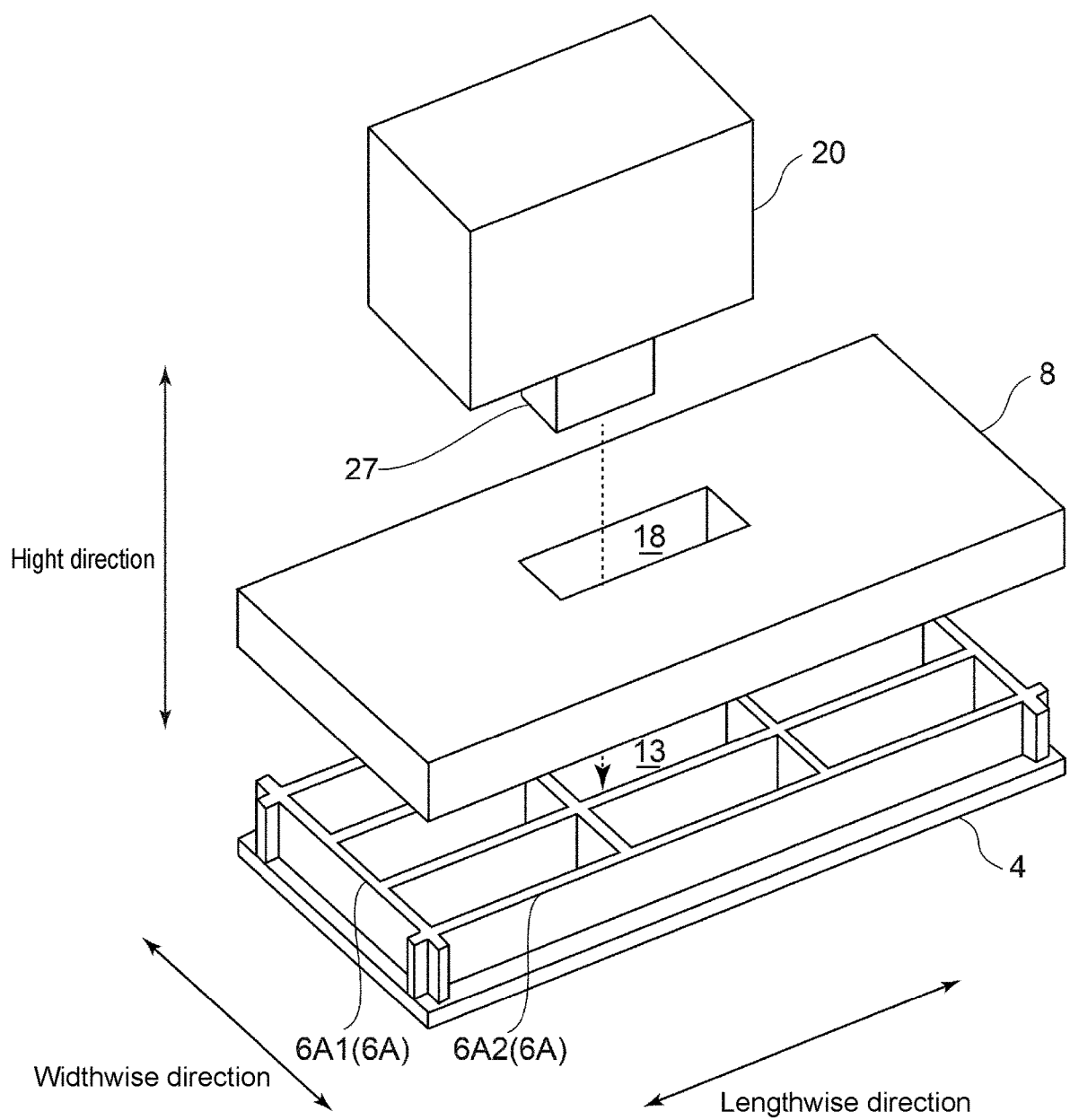
FIG. 6 is a perspective view for describing an internal structure of the vibration-proof mount according to an embodiment of the present invention.

FIG. 1A is a side view schematically showing the vibration-proof mount according to an embodiment of the present invention. FIG. 1B is a plan view schematically showing the vibration-proof mount according to an embodiment of the present invention. FIGS. 2A and 2B are views for describing a difference in load applied to a lower base plate owing to a difference in rigidity of the first mounting portion. FIG. 2A shows a case in which the first mounting portion has higher rigidity than the lower base plate. FIG. 2B shows a case in which the first mounting portion has lower rigidity than the lower base plate. FIGS. 3A and 3B are views for describing the load applied to the lower base plate of the vibration-proof mount according to an embodiment of the present invention. FIG. 3A shows a case in which the first cylinder vibrates. FIG. 3B shows a case in which the second cylinder vibrates. FIG. 4 is a side view schematically showing the vibration-proof mount according to an embodiment of the present invention. FIG. 5A is a side view schematically showing the vibration-proof mount according to an embodiment of the present invention. FIG. 5B is a side view schematically showing the vibration-proof mount according to an embodiment of the present invention. FIG. 6 is a perspective view for describing an internal structure of the vibration-proof mount according to an embodiment of the present invention.

As shown in FIGS. 1A, 4, 5A, and 5B, a vibration-proof mount 1 according to an embodiment of the present invention is a mount which is interposed between an engine 20 (vibration device) including cylinders 21 (vibration sources) and coil springs 51 (elastic members) disposed on a foundation surface 50. Then, the vibration-proof mount 1 includes an upper base plate 2, a lower base plate 4, and a plurality of connecting members 6.

As shown in FIGS. 1A, 4, 5A, and 5B, the upper base plate 2 includes a first mounting portion 8 where the engine 20 is mounted. As shown in FIG. 1B, the first mounting portion 8 is formed so as to include at least a region 8a1 where the engine 20 exists as viewed from the top.

The engine 20 mounted on the first mounting portion 8 is fixedly mounted on the first mounting portion 8 by a fixing member such as a stud bolt or a nut (not shown).

In the embodiment shown in FIG. 1B, the first mounting portion 8 is configured such that a length D1 in the lengthwise direction of the first mounting portion 8 (the longitudinal direction of the upper base plate 2) is at least longer than a length D2 from a lengthwise one-end side to the lengthwise other-end side of the arrangement surface 8a1 of the first mounting portion 8. Moreover, the first mounting portion 8 is configured such that a length W1 in the widthwise direction of the first mounting portion 8 (the lateral direction of the upper base plate 2) is at least longer than a length W2 from a widthwise one-end side to the widthwise other-end side of the arrangement surface 8a1 of the first mounting portion 8.

As shown in FIGS. 1A, 4, 5A, and 5B, the lower base plate 4 is arranged blow the upper base plate 2. The lower base plate 4 has an upper surface 4a to which the plurality of connecting members 6 to be described later are mounted. Then, the lower base plate 4 supports the upper base plate 2 via the plurality of connecting members 6.

In some embodiments, the peripheral edge of the lower base plate 4 is configured to be outside the peripheral edge of the upper base plate 2 as viewed from the height direction. Since the lower base plate 4 is thus configured, for example, it is possible to more dispersedly apply, to the lower base plate 4, a load from the engine 20 applied to the first mounting portion 8 of the upper base plate 2.

In the embodiments shown in FIGS. 1A, 4, 5A, and 5B, the lower base plate 4 has a lower surface 4b to which the upper ends of the coil springs 51 disposed on the foundation surface 50 are mounted. The coil springs 51 elastically support the lower base plate 4 as described above, preventing vibrations which are generated in the engine 20 mounted on the first mounting portion 8 from being transmitted to the foundation surface 50.

In some embodiments, the vibration-proof mount 1 may further include an additional base plate (not shown) arranged below the lower base plate 4 and supporting the lower base plate 4, and additional connecting members (not shown) connecting the lower base plate 4 and the additional base plate. That is, the vibration-proof mount 1 may be configured to have a three-stage structure including the upper base plate 2, the lower base plate 4, and the additional base plate. In this case, the upper ends of the coil springs 51 disposed on the foundation surface 50 are mounted the lower surface of the additional base plate.

As shown in FIGS. 1A, 4, 5A, and 5B, the plurality of connecting members 6 connect the upper base plate 2 and the lower base plate 4. Moreover, the plurality of connecting members 6 include at least two or more first connecting members 6A (6) disposed between the first mounting portion 8 and the lower base plate 4 at intervals from one another.

In the embodiments shown in FIGS. 1A, 4, 5A, and 5B, the plurality of connecting members 6 connect the upper base plate 2 and the lower base plate 4 such that the upper base plate 2 and the lower base plate 4 are parallel to each other. The first connecting members 6A are disposed between the first mounting portion 8 and the lower base plate 4 at intervals from one another along the lengthwise direction.

The plurality of connecting members 6 may respectively be fixed between the upper base plate 2 and the lower base plate 4 by being welded to the upper base plate 2 and the lower base plate 4. Alternatively, the plurality of connecting members 6 may respectively be fixed between the upper base plate 2 and the lower base plate 4 by fixing members such as stud bolts or nuts (not shown). Alternatively, the upper base plate 2, the lower base plate 4, and the plurality of connecting members 6 may integrally be formed.

The vibration-proof mount 1 having the above-described configuration is configured such that the first mounting portion 8 has higher rigidity than the lower base plate 4. In the embodiments shown in FIGS. 1A, 4, 5A, and 5B, the first mounting portion 8 is configured to be thicker than the lower base plate 4, and thus has the higher rigidity than the lower base plate 4 in the height direction. Alternatively, in some embodiments, the first mounting portion 8 may be configured to have the higher rigidity than the lower base plate 4 by being formed by a material having a higher Young modulus than a member forming the lower base plate 4.

With the vibration-proof mount 1 according to an embodiment of the present invention, the load from the engine 20 is applied to the first mounting portion 8 where the engine 20 (vibration device) is mounted. Then, the load applied to the first mounting portion 8 is applied to the lower base plate 4 by the plurality of connecting members 6 which include at least the two or more first connecting members 6A disposed between the first mounting portion 8 and the lower base plate 4 at intervals from one another. Then, the first mounting portion 8 is configured to have higher rigidity than the lower base plate 4.

Thus, as shown in FIGS. 2A and 2B, if the first mounting portion 8 has the higher rigidity than the lower base plate 4, deformation in the first mounting portion 8 owing to the load applied from the engine 20 is reduced as compared with a case in which the first mounting portion 8 has lower rigidity than the lower base plate 4 (see FIG. 2A). Therefore, it is possible to more dispersedly apply, to the lower base plate 4, the load from the engine 20 applied to the first mounting portion 8, via four first connecting members 6A (6A1 to 6A4). Since the load from the engine 20 is more dispersedly applied to the lower base plate 4, it is possible to reduce the thickness of the lower base plate 4, and thus to reduce the weight of the entire vibration-proof mount 1 than ever before.

Furthermore, as shown in FIGS. 2 and 3, the engine 20 may include the plurality of cylinders 21 each serving as the vibration source. Each of the plurality of cylinders 21 vibrates largely upon an explosion inside thereof. Then, the plurality of cylinders 21 respectively have different explosion (vibration) timings as shown in FIGS. 3A and 3B, and thus may result in a periodical change in magnitude, direction, position, or the like of the load applied to the first mounting portion 8.

The embodiment shown in FIG. 3A describes a state in which a first cylinder 21a (21) of the plurality of cylinders 21 arranged along the lengthwise direction vibrates. The first cylinder 21a is arranged at a position farthest from a generator 24 to be described later. In this state, a load owing to the vibration of the first cylinder 21a is applied to the first mounting portion 8 via the four first connecting members 6A (6A1 to 6A4).

In addition, the embodiment shown in FIG. 3B describes a state in which a second cylinder 21b (21) of the plurality of cylinders 21 arranged along the lengthwise direction vibrates. The second cylinder 21b is arranged at a position closer to the generator 24 than the first cylinder 21a. In this state as well, a load owing to the vibration of the second cylinder 21b is applied to the first mounting portion 8 via the four first connecting members 6A (6A1 to 6A4).

With the vibration-proof mount 1 according to an embodiment of the present invention, even if the magnitude, the direction, the position, or the like of the load applied to the first mounting portion 8 periodically changes as shown in FIGS. 3A and 3B, it is possible to widely and dispersedly apply, to the lower base plate 4, the load from the engine 20 applied to the first mounting portion 8 in each cycle.

Moreover, with the vibration-proof mount 1 according to an embodiment of the present invention, since the first mounting portion 8 has the higher rigidity than the lower base plate 4, reducing the deformation in the first mounting portion 8 caused by the load received from the engine 20, it is possible to suppress stresses applied to the first connecting members 6A.

In the embodiments shown in FIGS. 2 and 3, the engine 20 further includes pistons 28, and a crank shaft 29 to which the pistons 28 are mounted and which is coupled to a rotational shaft 26 of the engine 20 to be described later. The engine 20 is configured to drive the pistons 28 by the explosions inside the cylinders 21 and rotate the crank shaft 29 by thus driving the pistons 28. The engine 20 is also configured to rotate the rotational shaft 26 of the engine 20 by rotating the crank shaft 29.

In some embodiments, as shown in FIGS. 1A, 4, 5A, and 5B, the upper base plate 2 further includes a second mounting portion 9 where a connected device (generator 24) is mounted. The connected device (generator 24) is connected to the engine 20 via a connecting portion 22. In the present disclosure, a description is made by taking the generator 24 as an example of the connected device.

As shown in FIGS. 1A, 4, 5A, and 5B, the generator 24 is connected to the engine 20 via the connecting portion 22 connecting a rotational shaft 25 of the generator 24 and the rotational shaft 26 of the engine 20. The connecting portion 22 is, for example, a shaft coupling and transmits the rotation of the rotational shaft 26 of the engine 20 to the rotational shaft 25 of the generator 24.

As shown in FIG. 1B, the second mounting portion 9 is formed so as to include at least a region 9a1 where the generator 24 exists as viewed from the top. Further, the second mounting portion 9 is configured such that an upper surface 9a of the second mounting portion 9 does not overlap an upper surface 8a of the first mounting portion 8.

The generator 24 mounted on the second mounting portion 9 is fixedly mounted on the second mounting portion 9 by a fixing member such as a stud bolt or a nut (not shown).

In the embodiment shown in FIG. 1B, the second mounting portion 9 is configured such that a length D3 in the lengthwise direction of the second mounting portion 9 is at least longer than a length D4 from a lengthwise one-end side to the lengthwise other-end side of the arrangement surface 9a1 of the second mounting portion 9. Moreover, the second mounting portion 9 is configured such that a length W3 in the widthwise direction of the second mounting portion 9 is at least longer than a length W4 from a widthwise one-end side to the widthwise other-end side of the arrangement surface 9a1 of the second mounting portion 9.

In the embodiments shown in FIGS. 1A and 4, the upper base plate 2 is formed by integrating the first mounting portion 8 and the second mounting portion 9. That is, the upper base plate 2 is made of one plate-like member. In this case, the first mounting portion 8 and the second mounting portion 9 may be formed of the same material, or may be formed of different materials.

The vibration-proof mount 1 having the above-described configuration is configured such that the second mounting portion 9 is thinner than the first mounting portion 8, as shown in FIGS. 4, 5A, and 5B. In the depicted embodiments, the second mounting portion 9 is configured such that the upper surface 9a of the second mounting portion and the upper surface 8a of the first mounting portion 8 are flush with each other, and a lower surface 9b of the second mounting portion 9 is above the lower surface 9b of the first mounting portion 9 in the height direction.

In some embodiments, the second mounting portion 9 is configured such that the lower surface 9b of the second mounting portion 9 and a lower surface 8b of the first mounting portion 8 are flush with each other, and the upper surface 9a of the second mounting portion 9 is below the upper surface 8a of the first mounting portion 8 in the height direction. According to such configurations, it is possible to make the dimensions of the first connecting members 6A and a second connecting member 6B to be described later in the height direction substantially the same.

In many cases, the load of the generator 24 applied to the second mounting portion 9 is smaller than the load of the engine 20 applied to the first mounting portion 8 (for example, while the weight of the engine 20 is about 60 t, the weight of the generator 24 is about 20 t). Thus, the second mounting portion 9 is deformed less than the first mounting portion 8 with respect to the height direction. That is, the load applied to the second mounting portion 9 is applied to the lower base plate 4 more widely and dispersedly than the load applied to the first mounting portion 8.

According to such a configuration, since the second mounting portion 9 is configured to be thinner than the first mounting portion 8 as shown in FIGS. 4, 5A, and 5B, it is possible to reduce the weight of the second mounting portion 9, and thus to further reduce the weight of the entire vibration-proof mount 1.

In some embodiments, the connecting portion 22 is configured to suppress transmission of the vibrations generated in the engine 20 to the generator 24. Then, as shown in FIG. 5A, the upper base plate 2 includes a separating portion 10 separating the first mounting portion 8 from the second mounting portion 9.

That is, the upper base plate 2 is made of two plate-like members which are segmented by the separating portion 10 and are independent of each other. In this case, the first mounting portion 8 and the second mounting portion 9 may be formed of the same material, or may be formed of different materials.

The connecting portion 22 is, of shaft couplings, the shaft coupling which suppresses the transmission of the vibrations generated in the engine 20 to the generator 24. The shaft coupling elastically couples the rotational shaft 26 of the engine 20 and the rotational shaft 25 of the generator 24 so as to transmit the rotation of the rotational shaft 26 of the engine 20 to the rotational shaft 25 of the generator 24, and to restrain the vibrations generated in the engine 20 from being transmitted to the generator 24.

The separating portion 10 is a gap formed between the first mounting portion 8 and the second mounting portion 9, and has a lengthwise length to prevent the first mounting portion 8 from colliding against the second mounting portion 9 if the first mounting portion 8 vibrates due to the vibrations generated in the engine 20. Then, the separating portion 10 separates the first mounting portion 8 from the second mounting portion 9.

Meanwhile, in the vibration-proof mount 1 described with reference to FIGS. 1A and 4 as the examples, the second mounting portion 9 has, as loads applied thereto, the load from the generator 24 mounted on the second mounting portion 9 and a load owing to the vibrations of the engine 20 transmitted to the second mounting portion 9.

According to such a configuration, with the connecting portion 22 and the separating portion 10, it is possible to reduce the load applied to the second mounting portion 9 due to the vibrations generated in the engine 20. Thus, it is possible to further reduce the thickness of the second mounting portion 9 as compared with the second mounting portion 9 of the vibration-proof mount 1 described with reference to FIGS. 1A and 4 as the examples. It is also possible to further prevent the vibrations generated in the engine 20 from being transmitted to the second mounting portion 9 as compared with a case in which the upper base plate 2 includes a linking portion 11 to be described later.

In some embodiments, as described above, the connecting portion 22 is configured to suppress the transmission of the vibrations generated in the engine 20 to the generator 24. Then, as shown in FIG. 5B, the upper base plate 2 includes the linking portion 11 linking the first mounting portion 8 and the second mounting portion 9. Then, the linking portion 11 is made of a member which is softer than the first mounting portion 8.

That is, the upper base plate 2 is made of two plate-like members which are segmented by the linking portion 11 and are independent of each other. In this case, the first mounting portion 8 and the second mounting portion 9 may be formed of the same material, or may be formed of different materials.

The linking portion 11 links the first mounting portion 8 and the second mounting portion 9 with the member which is softer than the first mounting portion 8 so as to suppress transmission of a vibration from the first mounting portion 8 to the second mounting portion 9 if the first mounting portion 8 vibrates due to the vibrations generated in the engine 20. The soft member is, for example, a member which is formed of a material having a lower elastic modulus such as Young modulus or modulus of rigidity than a material forming the first mounting portion 8. For example, if the first mounting portion 8 is formed of iron, the linking portion 11 is formed of a rubber material such as fluorine rubber or silicon rubber.

According to such a configuration, with the connecting portion 22 and the linking portion 11, it is possible to reduce the load applied to the second mounting portion 9 due to the vibrations generated in the engine 20. Thus, it is possible to further reduce the thickness of the second mounting portion 9 as compared with the second mounting portion 9 of the vibration-proof mount 1 described with reference to FIGS. 1A and 4 as the examples. In addition, since the linking portion 11 links the first mounting portion 8 and the second mounting portion 9, it is possible to dispersedly apply, to the lower base plate 4, the load from the engine 20 applied to the first mounting portion 8, via the second connecting member 6B. That is, as compared with the case in which the upper base plate 2 includes the above-described separating portion 10, it is possible to more dispersedly apply, to the lower base plate 4, the load applied to the first mounting portion 8 and the loads applied to the second mounting portion 9.

In some embodiments, as shown in FIGS. 1A, 4, 5A, and 5B, the plurality of connecting members 6 include the second connecting member 6B (6) disposed between the second mounting portion 9 and the lower base plate 4. Then, the first connecting members 6A are configured to have the higher rigidity than the second connecting member 6B.

Since the first connecting members 6A have the higher rigidity than the second connecting member 6B, the first connecting members 6A may be configured to be thicker than the second connecting member 6B. Alternatively, the first connecting members 6A may be formed of a material having the higher rigidity than the second connecting member 6B.

According to such a configuration, it is possible to reduce the deformation in the first connecting members 6A as compared with a case in which the first connecting members 6A have rigidity similar to the second connecting member 6B. Therefore, it is possible to reduce a positional change, in the height direction, of the first mounting portion 8 supported by the first connecting members 6A.

In some embodiments, in a case in which the engine 20 is mounted on the first mounting portion 8, and the generator 24 is mounted on the second mounting portion 9, the rigidities of the first connecting members 6A and the second connecting member 6B are set such that the positions of the first mounting portion 8 and the second mounting portion 9 in the height direction are substantially the same.

According to such a configuration, the positions of the first mounting portion 8 and the second mounting portion 9 in the height direction are maintained to be substantially the same even if the engine 20 is mounted on the first mounting portion 8 supported by the first connecting members 6A, and the generator 24 which is lighter than the engine 20 is mounted on the second mounting portion 9 supported by the second connecting member 6B. Thus, it is possible to prevent the misalignment between the shaft core of the rotational shaft 26 of the engine 20 and the shaft core of the rotational shaft 25 of the generator 24.

In some embodiments, as described above, the vibration device is constituted by the engine 20, and the connected device is constituted by the generator 24 driven by the engine 20. According to such a configuration, it is possible to apply the vibration-proof mount 1 to a generating device 100 including the engine 20 and the generator 24, as shown in FIGS. 1A, 4, 5A, and 5B.

In some embodiments, as shown in FIG. 6, the first connecting members 6A each have a plate-like shape. Then, as shown in FIGS. 1A, 4, 5A, 5B, and 6, a housing space portion 13 defined by the first connecting members 6A and the lower base plate 4 is formed between the first mounting portion 8 and the lower base plate 4. Then, at least a part of an oil pan 27 of the engine 20 is housed in the housing space portion 13 while being spaced apart from the lower base plate 4.

In the embodiment shown in FIG. 6, each of the plurality of first connecting members 6A has the plate-like shape. Then, the plurality of first connecting members 6A include lengthwise first connecting members 6A1 (6A) disposed at intervals from one another in the lengthwise direction and widthwise first connecting members 6A2 (6A) disposed at intervals from one another in the widthwise direction.

In the embodiment shown in FIG. 6, four lengthwise first connecting members 6A1 and four widthwise first connecting members 6A2 are illustrated.

In the embodiment shown in FIG. 6, the lengthwise first connecting members 6A1 and the widthwise first connecting members 6A2 are configured to be combined with each other between the first mounting portion 8 and the lower base plate 4. Then, the lengthwise first connecting members 6A1 and the widthwise first connecting members 6A2 have a grid-like cross-sectional shape as viewed between the first mounting portion 8 and the lower base plate 4 from the height direction. That is, between the first mounting portion 8 and the lower base plate 4, the lengthwise first connecting members 6A1 and the widthwise first connecting members 6A2 form a plurality of space portions. Then, the plurality of space portions include the housing space portion 13 defined by the lengthwise first connecting members 6A1, the widthwise first connecting members 6A2, and the lower base plate 4.

In the embodiment shown in FIG. 6, the first mounting portion 8 includes a communication hole 18 formed therein, and the at least the part of the oil pan 27 of the engine 20 is configured to pass through the communication hole 18 and to be housed in the housing space portion 13. Then, as shown in FIGS. 1A, 4, 5A, and 5B, at least the part of the oil pan 27 of the engine 20 is housed while being spaced apart from the lower base plate 4.

According to such a configuration, since at least the part of the oil pan 27 of the engine 20 is housed in the housing space portion 13 defined between the first mounting portion 8 and the lower base plate 4, it is possible to lower the engine 20 mounted on the first mounting portion 8.

In addition, since the at least the part of the oil pan 27 of the engine 20 is housed in the housing space portion 13 while being spaced apart from the lower base plate 4, it is possible to prevent the vibrations generated in the engine 20 from being transmitted to the lower base plate 4 without intervening the plurality of connecting members 6.

The vibration-proof mount according to an embodiment of the present invention has been described above. However, the present invention is not limited thereto, and various modifications may be applied as long as they do not depart from the object of the present invention.

REFERENCE SIGNS LIST

1 Vibration-proof mount
2 Upper base plate
4 Lower base plate
6 Connecting member
6A First connecting member
6B Second connecting member
8 First mounting portion
9 Second mounting portion
10 Separating portion
11 Linking portion
20 Engine
21 Cylinder
22 Connecting portion
24 Generator
25 Rotational shaft of generator
26 Rotational shaft of engine
27 Oil pan
28 Piston
29 Crank shaft
50 Foundation surface
51 Coil spring
100 Generating device

The invention claimed is:

1. A vibration-proof mount which is interposed between a vibration device including a vibration source and an elastic member disposed on a foundation surface, the vibration-proof mount comprising:
   an upper base plate including a first mounting portion where the vibration device is mounted;
   a lower base plate arranged below the upper base plate and supporting the upper base plate; and
   a plurality of connecting members connecting the upper base plate and the lower base plate, the plurality of connecting members including at least two or more first connecting members disposed between the first mounting portion and the lower base plate at intervals from one another,
   wherein the first mounting portion is configured to be thicker than the lower base plate or to be formed by a material having a higher Young modulus than a member forming the lower base plate.

\* \* \* \* \*